(12) United States Patent
Ochiai et al.

(10) Patent No.: US 6,934,966 B1
(45) Date of Patent: Aug. 23, 2005

(54) SYSTEM FOR CAPTURING RESOURCES IN BROADCAST AND DATA COMMUNICATION IN UNIFICATION MODE

(75) Inventors: Katsuhiro Ochiai, Tokyo (JP); Hiroshi Matoba, Tokyo (JP)

(73) Assignee: NEC Corporation, (JP)

( * ) Notice: Subject to any disclaimer, the term of this patent is extended or adjusted under 35 U.S.C. 154(b) by 0 days.

(21) Appl. No.: 09/195,270

(22) Filed: Nov. 18, 1998

(30) Foreign Application Priority Data

Nov. 19, 1997 (JP) .................................. 9-333768

(51) Int. Cl.[7] ......................................... H04N 7/173
(52) U.S. Cl. ..................... 725/112; 725/93; 725/94; 725/95; 725/98; 725/116; 725/118; 725/146; 725/148; 725/68; 725/54; 725/71; 725/100; 725/131; 725/139; 725/151; 386/83
(58) Field of Search ............................... 725/93, 94, 95, 725/98, 116, 118, 146, 148, 87, 68, 54, 71, 725/100, 131, 139, 151; 386/83; 370/395.42, 370/444, 455; 709/238–240, 244

(56) References Cited

U.S. PATENT DOCUMENTS

| | | | | |
|---|---|---|---|---|
| 5,345,430 A | * | 9/1994 | Moe ................................ | 369/7 |
| 5,355,161 A | * | 10/1994 | Bird et al. .................... | 348/907 |
| 5,534,913 A | * | 7/1996 | Majeti et al. ................ | 725/114 |
| 5,541,917 A | * | 7/1996 | Farris ........................... | 370/352 |
| 5,584,006 A | * | 12/1996 | Reber et al. ................... | 360/13 |
| 5,650,994 A | * | 7/1997 | Daley .......................... | 370/259 |
| 5,684,525 A | * | 11/1997 | Klosterman ................... | 725/48 |
| 5,784,683 A | * | 7/1998 | Sistanizadeh et al. ........ | 370/487 |
| 5,805,806 A | * | 9/1998 | McArthur ..................... | 709/250 |
| 5,828,417 A | * | 10/1998 | Itagaki et al. ................. | 725/58 |
| 5,852,612 A | * | 12/1998 | Kostreski et al. ............. | 348/21 |
| 5,859,662 A | * | 1/1999 | Cragun et al. .............. | 725/137 |
| 5,883,677 A | * | 3/1999 | Hofmann ..................... | 348/584 |
| 5,886,732 A | * | 3/1999 | Humpleman ................. | 725/49 |
| 5,982,411 A | * | 11/1999 | Eyer et al. .................... | 725/49 |
| 5,990,883 A | * | 11/1999 | Byrne et al. ................. | 345/721 |

(Continued)

FOREIGN PATENT DOCUMENTS

WO    WO 92/22983    * 12/1992    .......... H04N 5/781

*Primary Examiner*—Chris Grant
*Assistant Examiner*—Jason Salce
(74) *Attorney, Agent, or Firm*—Dickstein, Shapiro, Morin & Oshinsky, LLP.

(57) ABSTRACT

A system is provided that can easily capture the same broadcast stream from an arbitrary application. An interface between application and a reception route selection mechanism describes in a unified mode a broadcast resource capture specification method and a communication resource capture specification method. The interface employs a description scheme in which an application does not recognize whether or not a broadcast stream is captured through broadcast or communication. In the reception route selection, the reception route selection mechanism checks for a broadcast time contained in the identifier of a broadcast stream to be input so that a zone where a broadcast time is earlier than the current time by using a communication resource receiver while a zone where the broadcast time is later than the current time is selected by using a broadcast resource receiver.

6 Claims, 3 Drawing Sheets

U.S. PATENT DOCUMENTS

| | | | |
|---|---|---|---|
| 6,021,432 A * | 2/2000 | Sizer et al. | 709/217 |
| 6,058,242 A * | 5/2000 | Kim | 386/83 |
| 6,061,056 A * | 5/2000 | Menard et al. | 345/704 |
| 6,072,983 A * | 6/2000 | Klosterman | 725/49 |
| 6,128,435 A * | 10/2000 | Galton | 386/109 |
| 6,157,411 A * | 12/2000 | Williams et al. | 348/552 |
| 6,167,188 A * | 12/2000 | Young et al. | 386/83 |
| 6,263,147 B1 * | 7/2001 | Tognazzini | 386/46 |
| 6,288,749 B1 * | 9/2001 | Freadman | 348/552 |
| 6,341,195 B1 * | 1/2002 | Mankovitz et al. | 386/83 |

* cited by examiner

FIG.1    OFFICE CODE 101/ START TIME 102/ END TIME 103

SYSTEM FOR CAPTURING RESOURCES IN BROADCAST AND DATA COMMUNICATION IN UNIFICATION MODE

BACKGROUND OF THE INVENTION

The present invention relates to a system including a method for capturing resources (such as images, data, and others) in broadcast and a method for capturing resources in data communication.

Conventionally, the method of capturing resources (videos, data, and others) through broadcast differs from the method of capturing resources through communications, viewed from application layers. Application developers must program applications by always considering broadcast and communications. Enormous efforts are imposed on application developers.

FIG. 6 is a block diagram illustrating a conventional method of capturing broadcast streams. Referring to FIG. 6, an application 601 decides whether or not a broadcast resource receiver 604 or a communication resource receiver 605 is used and then captures a broadcast stream using the resultant route. The broadcast resource receiver 604 is an apparatus having the function corresponding to a TV tuner while the communication resource receiver 605 is an apparatus having the function corresponding to a modem.

In order to decide the route for capturing a broadcast stream, the application 601 judges whether or not the broadcast receiver 604 will be able to receive in future a broadcast stream to be captured by a certain method and then decides whether or not the broadcast resource receiver 604 or the communication resource receiver 605 are used based on the result.

Application 601 interfaces with broadcast resource capture section 602 via capture broadcast resource specification interface 606. Broadcast resource capture section 602 is connected to broadcast resource receiver 604 via broadcast resource receptor control circuit 608.

Application 601 interfaces with communication resource capture section 603 via capture communication resource specification interface 607. Communication resource capture section 603 is connected to communication resource receiver 605 via communication resource reception control circuit 609.

When it is decided that the broadcast resource receiver 604 captures a broadcast stream, the broadcast resource receiver 604 waits until a capturable time, then receives a broadcast stream, and stores it into a temporary storage device. When it is decided that the communication resource receiver 605 captures a broadcast stream, the communication resource receiver 605 is connected to the server storing the broadcast stream and hands over the identifier of the broadcast stream to be captured by the application 601, and then captures the broadcast stream in agreement with the identifier.

Where a broadcast stream is captured according to the conventional technique, the application 601 must clearly recognize an identifier for identifying its broadcast stream. The identifier now has a name inherent to a system including the application 601. Hence, it is difficult that an arbitrary application captures the same broadcast stream unless a human judgment is provided.

All the capture routes for a broadcast stream are decided by the application 601. However, it is difficult that a language having only a low-level structure such as HTML (Hypertext Markup Language) in the World Wide Web technology makes a sophisticated judgment.

Moreover, even when a broadcast stream to be captured is formed of plural streams bridging program frames, the application 601 must recognize the situation. Hence, it is difficult to realize such a broadcast stream using the language structure such as HTML.

SUMMARY OF THE INVENTION

The present invention is made to solve the above-mentioned problems. The objective of the present invention is to provide a method for uniquely naming the identifiers of broadcast streams, being independent of the system.

Another objective of the present invention is to provide a method for automatically deciding a capture route using the naming method and for capturing a broadcast stream within an arbitrary range using the naming method.

The objective of the present invention is achieved by a system for capturing resources in broadcast and data communication in a unification mode, wherein a broadcast stream can be captured from resources in broadcast and resources in communication, the system employing a unified notation system being independent of a capture route, a capture time and an inherent name, to capture the broadcast stream.

In the resource capturing system according to the present invention, the unified notation system comprises a broadcast station code, a broadcast start time and a broadcast end time.

In the resource capturing system according to the present invention, the broadcast stream is a TV broadcast program.

In the resource capturing system according to the present invention, the broadcast stream is a radio broadcast program.

In the resource capturing system according to the present invention, the broadcast stream is an Internet broadcast program.

According to the present invention, the resource capturing system further comprises route selection for capturing the broadcast stream, the route selection being uniquely decided dependent on a broadcast time of the broadcast stream.

In the resource capturing system according to the present invention, when the broadcast time of the broadcast stream includes at the same time a past zone, a future zone, and a current zone inserted between the past zone and the future zone, a zone for a period between a current time and the end of a future time is received using a broadcast resource receiver while the past zone is received using a communication resource receiver.

In the resource capturing system according to the present invention, an arbitrary portion of the broadcast stream is cut and then transferred onto a communication route.

The first feature of the present invention is that the system for capturing resources in broadcast and data communication in a unification mode employs a unified notation method of identifying a broadcast stream, without depending on a capture route, a capture time and an inherent name, in order to capture a broadcast stream.

The second feature of the present invention is that the resource capturing system employs the method of uniquely deciding the route selection to capture a broadcast stream using the above-mentioned notation method. The third feature of the present invention is that the resource capturing system includes the method of cutting an arbitrary portion of a broadcast stream bridging plural streams and then capturing it using a communication route.

In the first feature of the present invention, a broadcast stream is captured without depending on a capture time or capture route of a system which tries a capture operation.

When an arbitrary application indicates the same broadcast stream, the same identifier can be obtained.

In the second feature of the present invention, an application described with a language which cannot make a complicated program structure can easily and selectively use the broadcast resource receiver and the communication resource receiver. The application itself does not make a complicated judgment but can selectively use the route necessary to capture the broadcast stream.

Moreover, in the third feature of the present invention, an application can capture arbitrarily and selectively a portion of a broadcast stream according to the same simple indicating method, independently of the actual structure in which a broadcast stream is stored.

BRIEF DESCRIPTION OF THE DRAWINGS

This and other objects, features and advantages of the present invention will become more apparent upon a reading of the following detailed description and drawings, in which:

FIG. 1 is a diagram illustrating the identifier of a broadcast stream according to an embodiment of the present invention;

DESCRIPTION OF THE EMBODIMENTS

Figure 2:
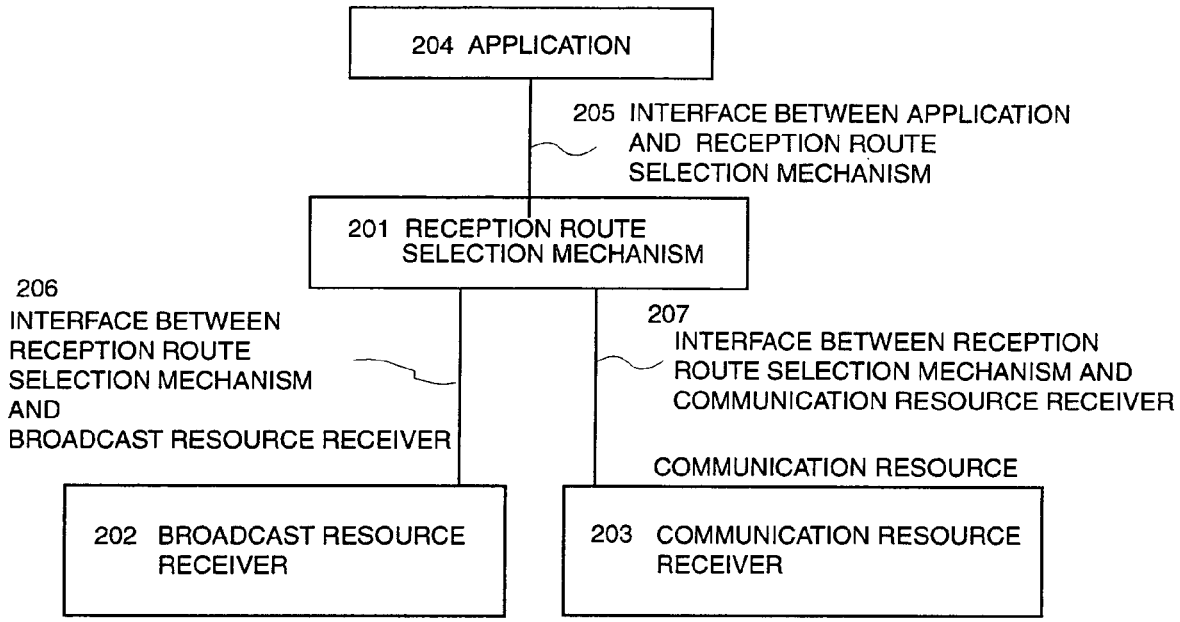
FIG. 2 is a block diagram illustrating a method for uniquely deciding route selection to capture a broadcast stream.

Next, an embodiment of the present invention will be described below in detail with reference to the attached drawings.

FIG. 1 illustrates a notation system for the identifier of a broadcast stream for reference, independent of a capture route, a capture time and an inherent name, according to an embodiment of the present invention. This notation system includes a broadcast station code (identifier) 101, the start time of a broadcast stream 102 and the end time of the broadcast stream 103.

The station code 101 has a unique value when indicating each station. For example, the station code 1 corresponds NHK TV (owned by NHK (Nippon Hoso Kyokai: Japan Broadcasting Corp.) in Japan); the station code 2 corresponds to NHK Educational TV (owned by NHK in Japan); and the station code 3 corresponds to Yomiuri TV (owned by the Yomiuri Shimbun in Japan). The same code system is used all over Japan. As to the start time and the end time of a broadcast stream, the time when a program has been broadcast (or is to be broadcast) is represented in year, month, day, hour, minute and second.

The case where a broadcast stream is a TV program has been described as an embodiment. The broadcast stream may be a radio program. If the station code 11 corresponds to Radio Nippon (owned by a private enterprise in Japan) and the station code 12 corresponds to FEN (Far East Network), the application can capture a unique identifier indicating a specific broadcast stream.

The above embodiment is applicable to the case where the broadcast stream is an Internet broadcast program. In some cases, since a general name common to all over the country is not used on an Internet, a substitutive notation ensuring the identification of a station, for example, a notation such as URL (Uniform Resource Locator) which consists of character chains is used. Regarding TV programs and radio programs, if a general name of a station is ensured all over the country, the name can be handled as a station code.

Figure 3:
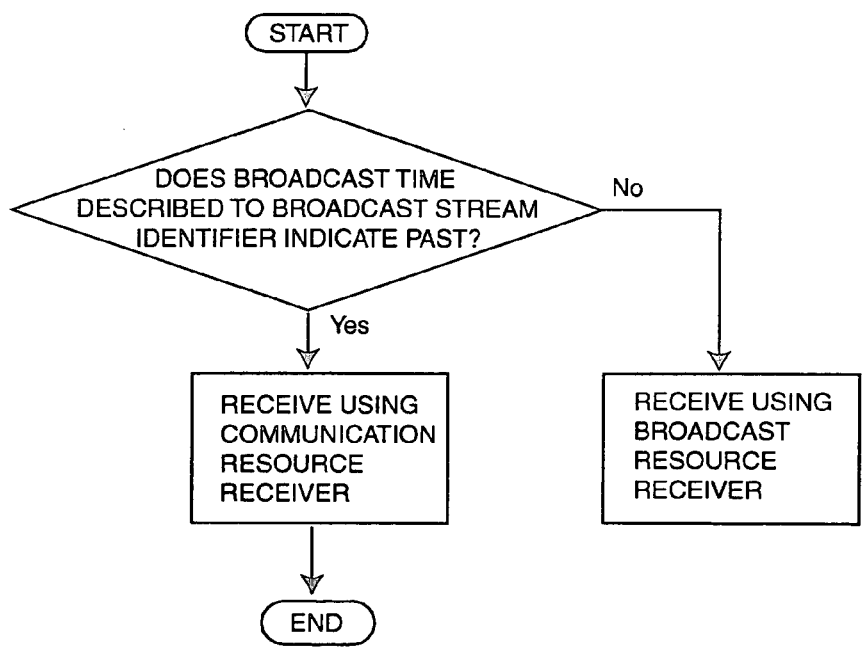
FIG. 3 is a flowchart explaining the operation shown in FIG. 2.

FIG. 2 shows an embodiment of the present invention where a route selection to capture a broadcast stream is uniquely decided using the above-mentioned notation method. FIG. 3 is a flowchart illustrating a type of decision mechanism included in the reception route selection mechanism 201 in FIG. 2.

Referring to FIG. 2, the interface 205 between an application and a reception route selection mechanism is an interface that can comprehensively describe the broadcast resource capture specification method and the communication resource capture specification method. The interface employs the descriptive system shown in FIG. 1 without recognizing the capturing operation through broadcast or communication, viewed from the application 204.

In order to select a reception route, the reception route selection mechanism 201 checks for the broadcast time contained in the identifier of the broadcast stream. The broadcast time in the past zone is received by the communication resource receiver 203 while the broadcast time in the zone following the current zone is received by the broadcast resource receiver 202. When the broadcast time includes at the same time a past zone and a future zone, and a current zone sandwiched between the past zone and a future zone, the broadcast resource receiver 202 receives the zone ranging the current time and the end time of the future zone while the communication resource receiver 203 receives the past zone.

The above-mentioned embodiment is applicable to case where the broadcast stream is a TV broadcast, radio broadcast, or Internet broadcast.

Figure 4:
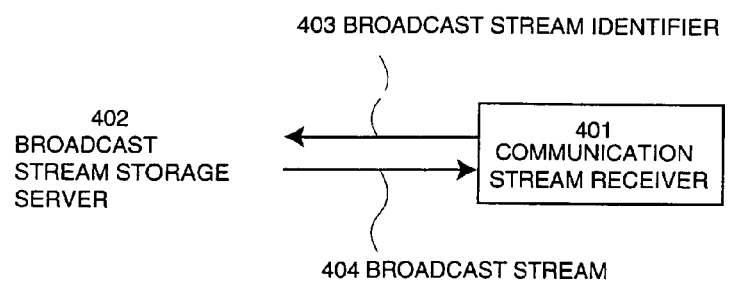
FIG. 4 is a block diagram illustrating the step of transferring a stream file onto a communication route according to the present invention.

FIG. 4 shows an embodiment of a system that cuts an arbitrary portion of the broadcast stream and then transfers to a stream file on a communication route, using the identifier of the broadcast stream.

In this system, when the communication resource receiver 401 hands over a broadcast stream identifier 403 representing a broadcast stream to be captured to the broadcast stream storage server 402, the broadcast stream storage server 402 searches for the broadcast stream stored in the broadcast stream storage server 402 based on the station code of a received identifier, the start time and the end time, cuts only the zone searched out, and then sends it to the communication resource receiver 401. When the corresponding start time and the end time overlaps with plural broadcast streams, the corresponding zone of each broadcast stream is cut out. Then all cut-out zones are transmitted as the broadcast stream 404 to the communication resource receiver 401.

Figure 5:
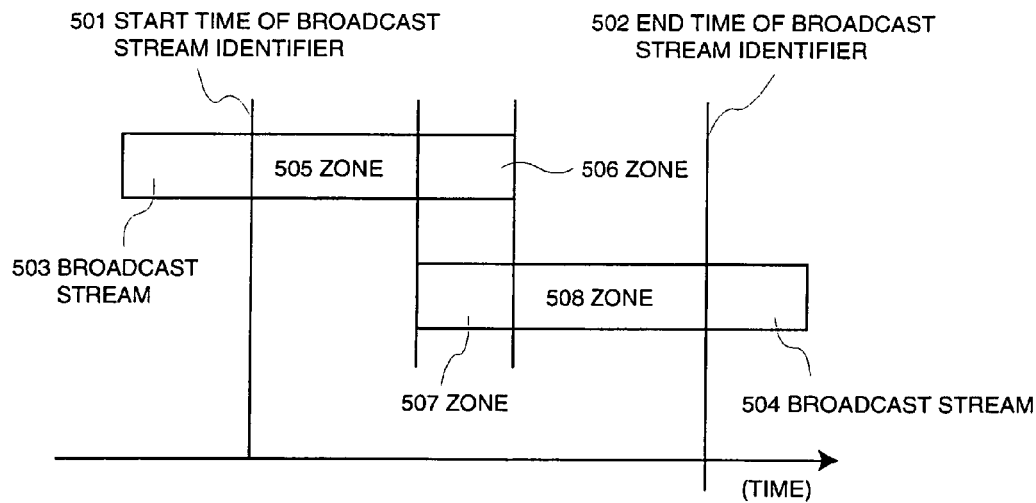
FIG. 5 is a diagram explaining the operation shown in FIG. 4.
Figure 6:
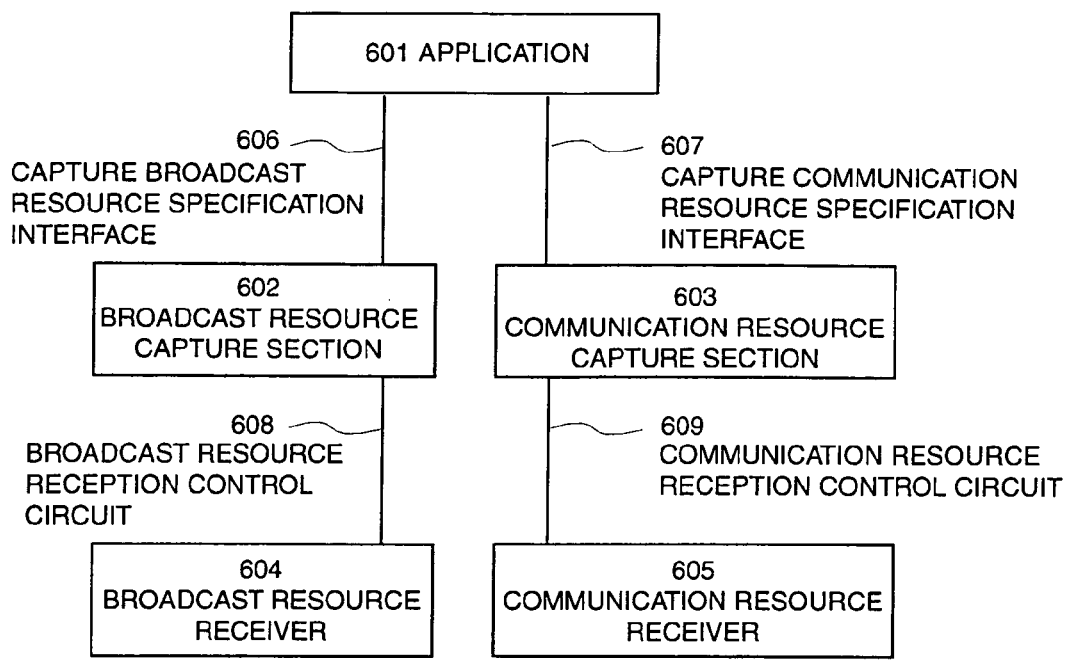
FIG. 6 is a diagram illustrating a conventional broadcast stream capturing method.

FIG. 5 shows the case where corresponding time overlaps with plural broadcast streams. The stream range corresponding to the zone between the start time 501 and the end time 502 of a broadcast stream includes a portion of the broadcast stream 503 and a portion of the broadcast stream 504. In this case, the broadcast stream storage server 402 cuts out the zone 505, the zone 506 (or zone 507) and the zone 508 and sends them to the communication resource receiver 401.

According to the present invention, since the unified notation for referring to a broadcast stream is employed, the same broadcast stream can be easily captured from an arbitrary application, independently of the capture route, time and inherent name. Since the mechanism that uniquely decides depending on the broadcast time is used for the route selection to capture a broadcast stream, plural routes are easily used to capture a broadcast stream by means of an application described in a low-level language. Since the mechanism is used that cut out and capture an arbitrary portion of a broadcast stream, a broadcast stream can be simply captured in a simple manner by an application, independently of the storage structure of an actual broadcast stream.

The entire disclosure of Japanese Patent Application No. 9-333768 filed on Nov. 19, 1997 including specification, claims, drawing and summary are incorporated herein by reference in its entirety.

What is claimed is:

1. A system for capturing resources in broadcast and data communications comprising:
    a broadcast resource receiver receiving at least a first broadcast stream, said broadcast resource receiver being responsive to a unified notation, said unified notation identifying at least said first broadcast stream and a second broadcast stream, said unified notation being independent from a capture route, a capture time, and an inherent name;
    a communication resource receiver receiving at least said second broadcast stream, said broadcast resource receiver being responsive to said unified notation;
    a reception route selection apparatus being responsive to said unified notation, said reception route selection apparatus selecting said broadcast resource receiver or said communication resource receiver for receiving one of said broadcast streams based on at least a first broadcast time corresponding to said first and second broadcast streams;
    further comprising route selection for capturing said broadcast streams, said route selection being uniquely decided dependent on a broadcast time of said broadcast streams; and
    wherein when the broadcast time of said broadcast streams simultaneously includes a past zone, a future zone, and a current zone inserted between said past zone and said future zone, a zone for a period between a current time and the end of a future time is received using said broadcast resource receiver or communication resource receiver while the past zone is received using the other of said broadcast resource receiver or said communication resource receiver, wherein said unified notation comprises a broadcast station code, a broadcast start time, and a broadcast end time.

2. A system for capturing resources in broadcast and data communications comprising:
    a broadcast resource receiver receiving at least a first broadcast stream, said broadcast resource receiver being responsive to a unified notation, said unified notation identifying at least said first broadcast stream and a second broadcast stream, said unified notation being independent from a capture route, a capture time, and an inherent name;
    a communication resource receiver receiving at least said second broadcast stream, said broadcast resource receiver being responsive to said unified notation;
    a reception route selection apparatus being responsive to said unified notation, said reception route selection apparatus selecting said broadcast resource receiver or said communication resource receiver for receiving one of said broadcast streams based on at least a first broadcast time corresponding to said first and second broadcast streams;
    further comprising route selection for capturing said broadcast streams, said route selection being uniquely decided dependent on a broadcast time of said broadcast streams; and
    wherein when the broadcast time of said broadcast streams simultaneously includes a past zone, a future zone, and a current zone inserted between said past zone and said future zone, a zone for a period between a current time and the end of a future time is received using said broadcast resource receiver or communication resource receiver while the past zone is received using the other of said broadcast resource receiver or said communication resource receiver.

3. A system for capturing resources in broadcast and data communications comprising:
    a broadcast resource receiver receiving at least a first broadcast stream, said broadcast resource receiver being responsive to a unified notation, said unified notation identifying at least said first broadcast stream and a second broadcast stream, said unified notation being independent from a capture route, a capture time, and an inherent name;
    a communication resource receiver receiving at least said second broadcast stream, said broadcast resource receiver being responsive to said unified notation;
    a reception route selection apparatus being responsive to said unified notation, said reception route selection apparatus selecting said broadcast resource receiver or said communication resource receiver for receiving one of said broadcast streams based on at least a first broadcast time corresponding to said first and second broadcast streams;
    further comprising route selection for capturing said broadcast streams, said route selection being uniquely decided dependent on a broadcast time of said broadcast streams; and
    wherein when the broadcast time of said broadcast streams simultaneously includes a past zone, a future zone, and a current zone inserted between said past zone and said future zone, a zone for a period between a current time and the end of a future time is received using said broadcast resource receiver or communication resource receiver while the past zone is received using the other of said broadcast resource receiver or said communication resource receiver, wherein at least one of said broadcast streams is a TV broadcast program.

4. A system for capturing resources in broadcast and data communications comprising:
    a broadcast resource receiver receiving at least a first broadcast stream, said broadcast resource receiver being responsive to a unified notation, said unified notation identifying at least said first broadcast stream and a second broadcast stream, said unified notation being independent from a capture route, a capture time, and an inherent name;
    a communication resource receiver receiving at least said second broadcast stream, said broadcast resource receiver being responsive to said unified notation;
    a reception route selection apparatus being responsive to said unified notation, said reception route selection apparatus selecting said broadcast resource receiver or said communication resource receiver for receiving one of said broadcast streams based on at least a first broadcast time corresponding to said first and second broadcast streams;

further comprising route selection for capturing said broadcast streams, said route selection being uniquely decided dependent on a broadcast time of said broadcast streams; and wherein when the broadcast time of said broadcast streams simultaneously includes a past zone, a future zone, and a current zone inserted between said past zone and said future zone, a zone for a period between a current time and the end of a future time is received using said broadcast resource receiver or communication resource receiver while the past zone is received using the other of said broadcast resource receiver or said communication resource receiver, wherein at least one of said broadcast streams is a radio broadcast program.

5. A system for capturing resources in broadcast and data communications comprising:

a broadcast resource receiver receiving at least a first broadcast stream, said broadcast resource receiver being responsive to a unified notation, said unified notation identifying at least said first broadcast stream and a second broadcast stream, said unified notation being independent from a capture route, a capture time, and an inherent name;

a communication resource receiver receiving at least said second broadcast stream, said broadcast resource receiver being responsive to a said unified notation;

a reception route selection apparatus being responsive to said unified notation, said reception route selection apparatus selecting said broadcast resource receiver or said communication resource receiver for receiving one of said broadcast streams based on at least a first broadcast time corresponding to said first and second broadcast streams;

further comprising route selection for capturing said broadcast streams, said route selection being uniquely decided dependent on a broadcast time of said broadcast streams; and wherein when the broadcast time of said broadcast streams simultaneously includes a past zone, a future zone, and a current zone inserted between said past zone and said future zone, a zone for a period between a current time and the end of a future time is received using said broadcast resource receiver or communication resource receiver while the past zone is received using the other of said broadcast resource receiver or said communication resource receiver, wherein at least one of said broadcast streams is an Internet broadcast program.

6. A system for capturing resources in broadcast and data communications comprising:

a broadcast resource receiver for receiving at least a first broadcast stream, said broadcast resource receiver being responsive to a unified notation; wherein said unified notation identifies at least said first and a second broadcast streams, said unified notation being independent from a capture route, a capture time, and an inherent name;

a communication resource receiver for receiving at least said second broadcast stream, said broadcast resource receiver responsive to said unified notation;

a reception route selection apparatus for selecting at least one of said broadcast streams, said reception route selection apparatus selecting said broadcast resource receiver or said communication resource receiver for receiving one of said broadcast streams based on a broadcast time for said broadcast streams, said route selection being uniquely decided dependent on a broadcast time of said broadcast stream; wherein when said broadcast time of said broadcast stream simultaneously includes a past zone, a future zone, and a current zone inserted between said past zone and said future zone, a zone for a period between said current time and the end of said future time is received using said broadcast resource receiver while the past zone is received using said communication resource receiver.

* * * * *